(12) United States Patent
Gazioglu

(10) Patent No.: US 11,295,527 B2
(45) Date of Patent: Apr. 5, 2022

(54) INSTANT TECHNIQUE ANALYSIS FOR SPORTS

(71) Applicant: Sprongo, LLC, Vail, CO (US)

(72) Inventor: Muzaffer Gazioglu, Vail, CO (US)

(73) Assignee: Sprongo, LLC, Vail, CO (US)

( * ) Notice: Subject to any disclaimer, the term of this patent is extended or adjusted under 35 U.S.C. 154(b) by 0 days.

(21) Appl. No.: 16/738,882

(22) Filed: Jan. 9, 2020

(65) Prior Publication Data

US 2021/0065452 A1 Mar. 4, 2021

Related U.S. Application Data

(60) Provisional application No. 62/894,143, filed on Aug. 30, 2019.

(51) Int. Cl.
| | |
|---|---|
| *G06T 19/00* | (2011.01) |
| *G06K 9/00* | (2006.01) |
| *G06T 11/60* | (2006.01) |
| *G06T 11/20* | (2006.01) |

(52) U.S. Cl.
CPC ........ *G06T 19/006* (2013.01); *G06K 9/00342* (2013.01); *G06K 9/00671* (2013.01); *G06K 9/00724* (2013.01); *G06T 11/203* (2013.01); *G06T 11/60* (2013.01); *G06T 2219/004* (2013.01)

(58) Field of Classification Search
None
See application file for complete search history.

(56) References Cited

U.S. PATENT DOCUMENTS

| | | | | |
|---|---|---|---|---|
| 5,689,241 | A * | 11/1997 | Clarke, Sr. | A61B 5/18 340/575 |
| 7,974,443 | B2 * | 7/2011 | Kipman | G06K 9/00362 382/103 |
| 9,355,305 | B2 * | 5/2016 | Tanabiki | G06T 7/75 |
| 2011/0267344 | A1 * | 11/2011 | Germann | G06T 15/205 345/420 |
| 2013/0296048 | A1 * | 11/2013 | Jeffery | A63F 13/355 463/31 |
| 2016/0065842 | A1 * | 3/2016 | McCloskey | H04N 5/23238 348/36 |
| 2016/0216770 | A1 * | 7/2016 | Jang | G16H 20/30 |
| 2017/0177930 | A1 * | 6/2017 | Holohan | G16H 20/30 |

(Continued)

OTHER PUBLICATIONS

Carranza, Joel, et al. "Free-viewpoint video of human actors." ACM transactions on graphics (TOG) 22.3 (2003): 569-577.*

(Continued)

*Primary Examiner* — James A Thompson
(74) *Attorney, Agent, or Firm* — Kilpatrick Townsend & Stockton LLP

(57) ABSTRACT

A method for providing automated video analytics includes receiving, at a computing device, an image and detecting a person within the image. A pose of the person within the image is determined and a plurality of points are identified based on the pose. Each point is indicative of a location of a body part of the person. A posture skeleton is generated based on the plurality of points. The posture skeleton includes lines interconnecting at least some of the plurality of points. The image is outputted with the posture skeleton superimposed over the person.

20 Claims, 13 Drawing Sheets

(56) References Cited

U.S. PATENT DOCUMENTS

| | | | | |
|---|---|---|---|---|
| 2018/0020954 | A1* | 1/2018 | Lillie | G16H 50/50 |
| | | | | 600/476 |
| 2018/0315202 | A1* | 11/2018 | Perry | H04N 5/23229 |
| 2019/0366153 | A1* | 12/2019 | Zhang | A63B 24/0062 |
| 2020/0078657 | A1* | 3/2020 | Kubota | A63B 71/06 |
| 2020/0097732 | A1* | 3/2020 | Doolittle | G06T 7/246 |
| 2020/0219284 | A1* | 7/2020 | Tsang | G06T 7/251 |
| 2020/0222757 | A1* | 7/2020 | Yang | G09B 5/06 |
| 2020/0320719 | A1* | 10/2020 | Lee | A63B 69/3623 |
| 2021/0001172 | A1* | 1/2021 | Namboodiri | A63B 24/0062 |
| 2021/0049353 | A1* | 2/2021 | Bian | G06K 9/3233 |
| 2021/0338110 | A1* | 11/2021 | Gingrich | A61B 5/7475 |

OTHER PUBLICATIONS

Oagaz, Hawkar, et al. "Neurocognitive assessment in virtual reality through behavioral response analysis." IEEE journal of biomedical and health informatics 23.5 (2018): 1899-1910.*

Zou, Beiji, et al. "Automatic reconstruction of 3D human motion pose from uncalibrated monocular video sequences based on markerless human motion tracking." Pattern Recognition 42.7 (2009): 1559-1571.*

Fang, et al., RMPE: Regional Multi-Person Pose Estimation, 2017 IEEE Conference on Computer Vision, 2017, pp. 2353-2362.

Redmon, et al., "An Incremental Improvement", Tech Report, Apr. 8, 2018, 6 pages.

Redmon, et al., "YOLO9000: Better, Faster, Stronger", 2017 IEEE Conference on Computer Vision and Pattern Recognition, 2017, pp. 6517-6525.

* cited by examiner

INSTANT TECHNIQUE ANALYSIS FOR SPORTS

CROSS-REFERENCES TO RELATED APPLICATIONS

This application claims the benefit of U.S. Provisional Application No. 62/894,143, entitled "INSTANT TECHNIQUE ANALYSIS FOR SPORTS", filed on Aug. 30, 2019, the entire contents of which are hereby incorporated by reference.

BACKGROUND OF THE INVENTION

Athletes and trainers are constantly looking to gain an edge. Recently, competitors have turned to using video analytics to help correct an athlete's form or technique. Such analytics often involve annotations, such as posture lines, being drawn over images. Conventional video analytics techniques require these annotations to be hand drawn, such as by dragging a mouse or other cursor over an area that should be annotated. Along with requiring human input, conventional analytics systems also fail to provide annotations that may move along with a video. Thus, annotations and analytics must be performed and viewed one frame at a time for video files.

BRIEF SUMMARY OF THE INVENTION

Embodiments of the present invention are directed to systems and methods for providing quick and accurate posture and movement analysis. Embodiments include both local and cloud-based processing systems that enable users to provide still images and/or videos for analysis of positioning and/or angles of body parts. This allows a user to get quick visual feedback, both in terms of a displayed posture skeleton and/or the output of angular and/or other numerical position data that enable a user to quickly analyze a particular movement or portion of a movement in order to better understand how to optimize the movement technique of the individual in the image.

According to one embodiment, a method for providing automated video analytics is provided. The method may include receiving, at a computing device, an image, detecting a person within the image, and determining a pose of the person within the image. The method may also include identifying a plurality of points based on the pose. Each point may be indicative of a location of a body part of the person. The method may further include generating a posture skeleton based on the plurality of points. The posture skeleton may include lines interconnecting at least some of the plurality of points. The method may include outputting the image with the posture skeleton superimposed over the person.

In some embodiments, the image may be received over a network from a remote computing device. In some embodiments, the method may include determining an angle of at least one of the body parts and outputting the angle of the at least one of the body parts. In some embodiments, the image may include a frame of a video. In some embodiments, an additional posture skeleton may be generated for at least one additional frame of the video. In some embodiments, outputting the image may include outputting a video file in which the person moves and the posture skeleton and the additional posture skeleton move in synch with the person. In some embodiments, the outputted image may include a three-dimensional image.

In another embodiment, a computing device for providing automated video analytics is provided. The computing device may include a communications interface, a processor, and a memory having instructions stored thereon. When executed by the processor, the instructions cause the computing device to receive an image, detect a person within the image, and determine a pose of the person within the image. The instructions may also cause the computing device to identify a plurality of points based on the pose. Each point may be indicative of a location of a body part of the person. The instructions may further cause the computing device to generate a posture skeleton based on the plurality of points. The posture skeleton may include lines interconnecting at least some of the plurality of points. The instructions may also cause the computing device to output the image with the posture skeleton superimposed over the person.

In some embodiments, the computing device may be a mobile communications device. In some embodiments, the processor may be further configured to output an additional image in a side by side arrangement with the image. In some embodiments, detecting a person within the image may include receiving a selection that identifies the person within the image. In some embodiments, outputting the image may include communicating the image to a remote computing device. In some embodiments, the posture skeleton may be a geometrical representation of the pose of the person. In some embodiments, the processor may be further configured to receive one or more parameters associated with image and provide analysis of the image based on the one or more parameters.

In another embodiment, a method for providing automated video analytics includes receiving, at a computing device, a video file, detecting a person within the video file, and determining a pose of the person for each of a plurality of frames within the video file. The method may also include identifying a plurality of points based on each pose. Each point may be indicative of a location of a body part of the person. The method may further include generating a posture skeleton for each of the plurality of frames based on the plurality of points. Each posture skeleton may include lines interconnecting at least some of the plurality of points. The method may include outputting an annotated video file with the posture skeleton superimposed over the person in each of the plurality of frames.

In some embodiments, the method may include receiving an input comprising an adjustment of at least a portion of the posture skeleton for at least one of the plurality of frames. In some embodiments, the video file may include multiple views of the person, with each of the multiple views being taken from a different angle. The method may then include stitching the multiple views together to form a three-dimensional view of the person. In some embodiments, the annotated video may include the three-dimensional view of the person. In some embodiments, the annotated video may be rotatable to change a viewing angle of the annotated video and rotation of the annotated video may cause a corresponding rotation of the posture skeleton. In some embodiments, the method may also include comparing the video to a previously stored video and providing a suggested movement correction based on the comparison.

DETAILED DESCRIPTION OF THE INVENTION

Embodiments of the present invention are related to a web and/or app-based platform that allows trainers, athletes, and/or other users to share images (such as still images and/or videos), create annotations on the images, and provide feedback and positioning of the athletes to improve their performance. Notably, embodiments of the invention enable trainers and athletes to perform accurate analysis of body positioning and/or movements much quicker than conventional systems. Moreover, embodiments, provide visual representations of body positioning, outputs of angular measurements of the body, and allow for annotations to be automatically generated on individual images to provide feedback that is usable to train users in performing practically any movement-based activity. Embodiments also enable the comparison of multiple images to further improve analysis capabilities of its users. While embodiments described herein include examples using skiers and golfers, it will be appreciated that techniques described herein may be applied to any other sport or skill movement. Additionally, it will be appreciated that when used herein, the term "image" may include still images, videos, a frame from a video, and/or other types of images.

Figure 1:
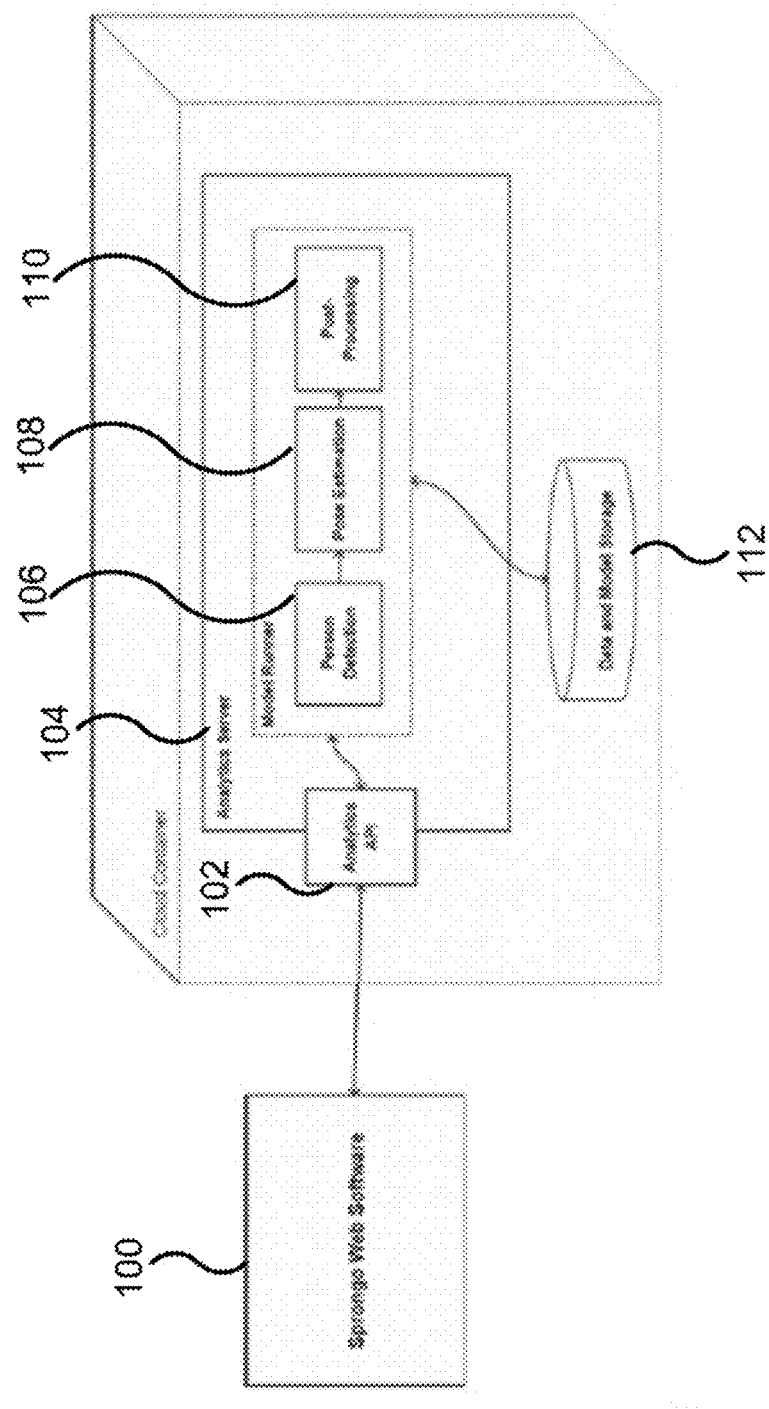
FIG. 1 illustrates a system architecture of a system for providing cloud-based posture analytics according to embodiments.

As illustrated in FIG. 1, a web application 100 may provide an interface that allows a user to upload images, such as still images and/or videos, to be analyzed. Web application 100 may be a platform that is presented as a website hosted on a remote server, which allows users who have access to network-enabled devices to leverage the analytics capabilities of a posture analysis system 104 to automatically analyze the images, without the users needing analytics software installed on their device. Web application 100 may be accessed via a web browser using a remote computing device 114, such as a mobile phone, tablet computer, e-reader, laptop computer, desktop computer, etc. In some embodiments, the web application 100 may be accessed using a graphical user interface of position analysis software that is downloaded onto and executed by the remote computing device 114. For example, In some embodiments, position analysis software may be provided to a personal computer and/or mobile device (with the software being in the form of a mobile application). This software may provide a user interface that allows a user to interact with the web application 100 and/or other computing devices that perform the cloud-based position analysis. Additionally, such cloud-based solutions enable the analytics to be performed for users that do not have devices with central processing units and/or graphical processing units that are sufficiently powerful to efficiently perform the necessary image analytics. The web application 100 may interface with the posture analysis system using an analytics API 102.

The posture analysis system 104 may be a server that includes machine learning analytics software to provide a cloud-based analytics solution. For example, the posture analysis system 104 may include a person detection module 106, a pose estimation module 108, and a post-processing module 110. It will be appreciated that other arrangements of software modules are possible. For example, the posture analysis system 104 may include a separate person detection, pose estimation, and/or post-processing module for each type of sport or other activity.

In practice, a user may upload an image (such as a still image and/or a video) to the web application 100. The user may also specify a number of parameters to be considered in the analysis of the image. Such parameters may include, for example, a type of sport or activity shown in the video, a specific athletic feat, movement, and/or sport (e.g., putting, chipping, driving, throwing, kicking, walking a catwalk, skiing, etc.). The parameters may be particularly useful in embodiments in which comparison images and/or analytics (such as optimal movement metrics for a particular movement or tasks) are to be automatically selected for a given image. For example, upon receiving a selection of the parameters, the web application 100 may provide one or more images of previously analyzed similar movements from the same person or another person (such as a professional athlete) based on the selected parameter. In some embodiments, the web application 100 may provide optimal movement metrics (such as angular positions for one or more joints and/or absolute positions for one or more body parts) to the user. The optimal movement metrics may be based on analysis of one or more similar movements performed by known and/or otherwise accepted experts. The optimal movement metrics may be in the form of absolute positions and/or angular measurements and/or as optimal ranges for such positions and/or angular measurements. In some embodiments, the web application 100 may provide a comparison of the person's movement metrics and the optimal movement metrics. The comparison may also include suggested corrections for the person to move the person's movement metrics closer to the values and/or ranges of the optimal movement metrics. As just one example, the person's movement metrics may show a knee bend and/or spine angle that is lower than exhibited by experts performing the same movement. The web application 100 may then display a suggestion that the user may need to reduce the knee bend and/or stand more upright by a particular amount during the movement to achieve better movement results.

The web application 100 may then send the image and any parameters to the posture analysis system 104 through the analytics API 102. The image may be passed to the person detection module 106, which may identify any people within the image. Person detection is a subcategory of object detection in computer vision. The person detection module 106 is responsible for finding the bounding boxes containing the human images. These boxes are required to find the estimate the relative poses of people. For person detection, an object detection network is utilized that looks at the entire image at test time and makes predictions as to what objects are people, with these predictions being informed by the global context in the image. The person detection module 106 also makes predictions with a single network evaluation using convolutional neural networks. The object detection network reframes the object as a single regression problem, straight from image pixels to bounding box coordinates and class probabilities. Processing speed is the key driver for quality. The system is compatible with numerous object detection methods.

The selection of one or more persons to analyze may be performed in any number of manners. For example, in embodiments in which one or more parameters (such as a specific athletic feat, movement, and/or sport) are input, the parameters may be used by the web application to identify a person based on a pose and/or movement detected within the image. For example, if the parameters indicate that the image includes a golfer hitting a tee shot, the web application 100 may detect a person within the image that has a pose and/or movement that matches known tee shot positions and/or movements. This may allow the web application 100 to readily select an athlete or other performer in a video that may include coaches, spectators, and/or other people who are not performing the movement. In other embodiment, such as those in which only one person is shown, the web application 100 may be configured to automatically detect the person.

In some embodiments, a neural network may be used to perform object detection to identify the person or people within an image. Such object detection is described in J. Redmon and A. Farhadi. Yolo9000: Better, faster, stronger. In Computer Vision and Pattern Recognition (CVPR), 2017 IEEE Conference on, pages 6517-6525. IEEE, 2017 and in J. Redmon and A Farhadi. Yolov3: An incremental Improvement, Tech Report 2018, the entire contents of which are hereby incorporated by reference. As just one example, a single neural network may apply a detection algorithm to an image to predict both object class labels (a descriptive category of an identified object) and locations of the objects. The algorithm works off by dividing each image into a number of cells. For each cell, bounding boxes and corresponding confidence scores are predicted. Class probabilities are also generated that indicate a predicted classification for each detected object. The confidence is given in terms of an intersection over union metric, which measures how much a detected object overlaps with the ground truth as a fraction of the total area spanned by the two together (the union). The loss the algorithm minimizes takes into account the predictions of locations of the bounding boxes, their sizes, the confidence scores for said predictions and the predicted classes. In some embodiments, anchor boxes (predetermined sets of boxes such that the network moves from predicting the bounding boxes to predicting the offsets from these) may be used to help predict smaller objects within the images.

For example, in one embodiment, an image (or series of images) of a particular size (e.g., (608, 608, 3)) may be input to the person detection module 106. The input image may be passed through a convolutional neural network (CNN), resulting in a (19, 19, 5, 85) dimensional output. The neural network may then downsample the image by a factor called the "stride" of the network. Generally, stride of any layer in the network is equal to the factor by which the output of the layer is smaller than the input image to the network. For example, if the stride of the network is 32, then an input image of size 608×608 will yield an output of size 19×19.

After flattening the last two dimensions, the output is a volume of shape (19, 19, 425). Each cell in a 19×19 grid over the input image gives 425 numbers (425=5×85 because each cell contains predictions for 5 boxes, corresponding to 5 anchor boxes) and (85=5+80 where 5 is because (pc,bx, by,bh,bw) has 5 numbers, and 80 is the number of classes we'd like to detect). Some of the boxes are selected based on a score threshold. For example, the neural network may discard boxes that have detected a class with a score less than the threshold. Non-max suppression may be performed to compute the intersection over union and avoid selecting overlapping boxes. This provides a final output of detected object locations and classes. In the present embodiment, the class of any detected object will likely be a person or equipment associated with the movement being performed. The location and class of the object may be then passed to the pose estimation module.

In some embodiments, the web application 100 may allow a user to select a person to be analyzed. For example, the user may utilize the interface of the web application 100 to select a person within the image. In some embodiments, this may be done by the user drawing a box around the person in the image who is to be analyzed, while in other embodiments, the user may click on the person's body and/or otherwise indicate a selection of the person. Such selection techniques may be particularly useful when an image includes multiple people, and even more in situations where multiple people within the video are performing similar movements (such as an image of multiple golfers on a driving range or multiple skiers on a slope).

Once the person (or people) is detected, the image may be passed to the pose estimation module 108. The pose estimation module 108 determines the location of certain body parts in a given image. These body parts consist of important body parts and joints. For example, the points may include, but are not limited to, a person's nose, neck, left shoulder, left elbow, left wrist, right shoulder, right elbow, right wrist, left hip, left knee, left ankle, right hip, right knee, and/or right ankle. In some embodiments, the pose estimation module 108 utilizes a regional multi-person pose estimation (RMPE) framework, which works in real-time with multiple people on the image. The RMPE works as a regressor for several body parts that considers the relative position of the body parts. Once the body parts are identified, data points may be assigned to the location each body part. Once the data points are assigned, the image may be passed to the post-processing module 110 for additional processing. For example, the post-processing module 110 may calculate the defined positions and angles between various data points and/or lines extending between the data points for each of the images. A data and model storage 112 may be used to store the images with requested parameters, prediction results, models, and/or corrected data.

In some embodiments, the RMPE framework applied by the pose estimation module 108 may take in bounding boxes from the person detection module 106 that bound detected persons and feed these bounding boxes into a Symmetric Spatial Transformer Network (SSTN) to extract a high-quality single person region from an inaccurate bounding box. A Single Person Pose Estimator (SPPE) is used in this extracted region to estimate the human pose skeleton for that person. A Spatial De-Transformer Network (SDTN) is used to remap the estimated human pose back to the original image coordinate system. Finally, a parametric pose Non-Maximum Suppression (NMS) technique is used to handle the issue of redundant pose deductions. Such processes are described in greater detail in Hao-Shu Fang, Shuqin Xie, Yu-Wing Tai, and Cewu Lu. RMPE: Regional multi-person pose estimation. In ICCV, 2017, the entire contents of which is hereby incorporated by reference.

This process may be performed for each image and/or frame of a video. In some embodiments, for videos of multiple frames, the posture analysis system may create datasets for each image within an interval of frames and measure the rate of change (such as lateral and/or vertical changes of a data point/body part and/or change in angle between lines extending between the data points) from one frame to the next. The data points (and possibly the processed image) may sent to the web application 100, which may then create a "posture skeleton" for each image and/or frame from point data that is returned from the posture analysis system 104. The posture skeleton may serve as a geometrical representation of the pose of the person and may include lines interconnecting at least some of the of data points. The posture skeleton may be displayed on a page of the web application 100, and may be superimposed over the original image. For videos, a number of posture skeletons may be generated such that when the video plays, the posture skeletons move in synch with the person shown in the video.

Figure 2:
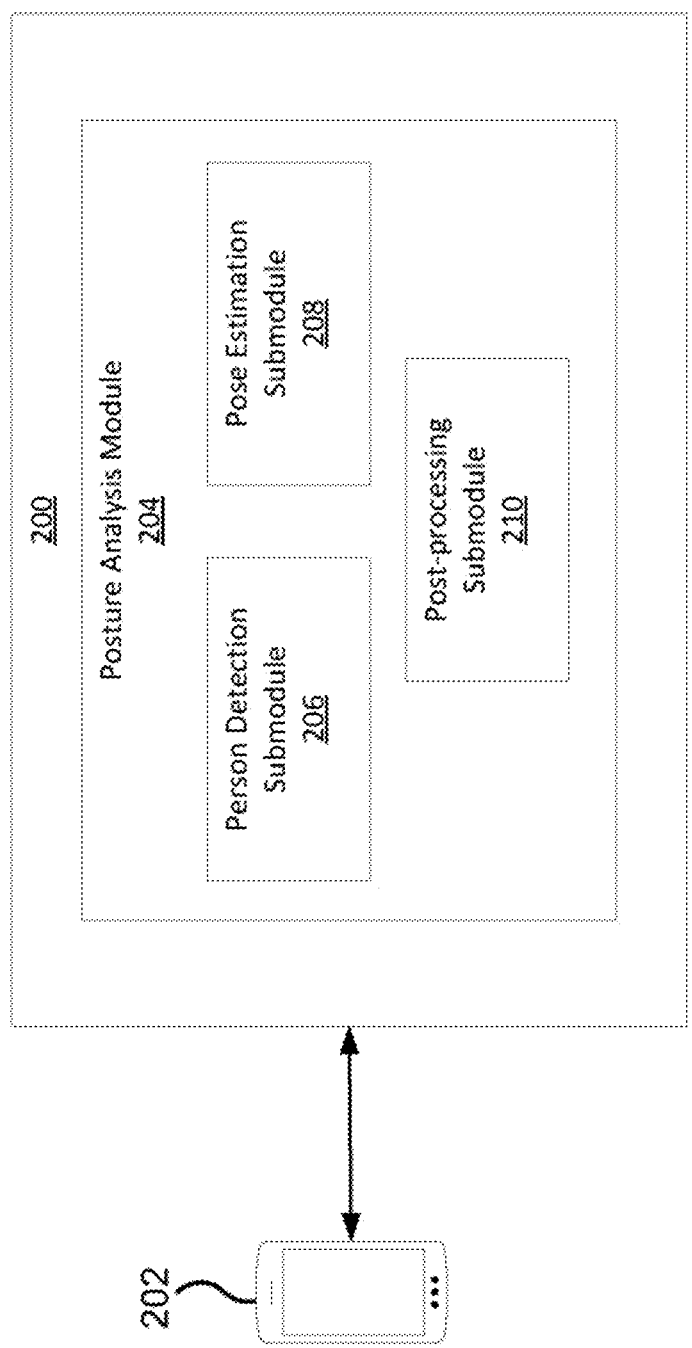
FIG. 2 illustrates a system architecture of a system for providing locally processed posture analytics according to embodiments.

In some embodiments, rather than offering a cloud-based position analysis solution, the present invention may be integrated into a software package that is executable by a standalone computing device, such as a personal computer, tablet computer, mobile phone, and/or other computing device. As just one example, the software may be provided in the form of a mobile application that is executable by a mobile computing device. Such solutions may be particularly useful for computing devices that have powerful central processing units (CPUs), graphical processing units (GPUs), system memory, and/or other components that enable the position analysis to be quickly performed locally on the device. As illustrated in FIG. 2, a mobile application and/or other software platform 200 may provide an interface is that displayable on a user's computing device 202 that allows a user to upload images, such as still images and/or videos, to be analyzed. Software platform 200 may include similar components to the posture analysis system 104 to enable posture analysis to be performed locally at the user device 202. For example, the software platform 200 may include various modules that enable the user device 202 to automatically analyze the images and output annotates images and/or angular data that are usable to train users in a particular movement activity.

In some embodiments, the software platform 200 includes a graphical user interface that allows a user to interact with the software platform 200 using the user device, such as by using a keyboard, touchscreen, stylus, and/or other input device. The software platform 200 includes a posture analysis module 204 that includes machine learning analytics software and that operates locally on the user device 202 in a manner similar to the cloud-based posture analysis system 104. For example, the posture analysis software module 204 may include a person detection submodule 206, a pose estimation submodule 208, and a post-processing module 210. It will be appreciated that other arrangements of software modules are possible. For example, the posture analysis module 204 may include a separate person detection, pose estimation, and/or post-processing submodule for each type of sport or other activity.

In practice, a user may upload and/or otherwise select an image (such as a still image and/or a video) using the user interface of the software platform 200. The user may also specify a number of parameters to be considered in the analysis of the image. Such parameters may include, for example, a type of sport or activity shown in the video, a specific athletic feat, movement, and/or sport. The posture analysis module 104 may then pass the image to the person detection submodule 206, which may identify any people within the image similar as done above using person detection module 106. The selection of persons may be performed in a manner similar to how person detection is done in the cloud-based embodiment. Once the person (or people) is detected, the image may be passed to the pose estimation submodule 208. The pose estimation submodule 208 determines the location of certain body parts in a given image. These body parts consist of important body parts and joints. In some embodiments, the pose estimation module 108 utilizes a regional multi-person pose estimation (RMPE) framework, which works in real-time with multiple people on the image. The RMPE works as a regressor for several body parts that considers the relative position of the body parts. Once the body parts are identified, data points may be assigned to the location each body part. Once the data points are assigned, the image may be passed to the post-processing submodule 210 for additional processing. For example, the post-processing submodule 210 may calculate the defined positions and angles between various data points and/or lines extending between the data points for each of the images.

In some embodiments, this process may be performed for each image and/or frame of a video. In some embodiments, for videos of multiple frames, the posture analysis system may create datasets for each image within an interval of frames and measure the rate of change (such as lateral and/or vertical changes of a data point/body part and/or change in angle between lines extending between the data points) from one frame to the next. The software platform 200 may take these data points (and possibly the processed image) and create a "posture skeleton" for each image and/or frame from point data that is returned from the posture analysis module 204, which may be output using a display screen of the user device 202. For videos, a number of posture skeletons may be generated such that when the video plays, the posture skeletons move in synch with the person shown in the video.

In some embodiments, the posture analysis systems described herein (with cloud-based and/or local processing) may be used to provide 3-dimensional posture analysis. For example, a user may select multiple views of the same movement (such as images acquired using multiple cameras that are positioned at different locations and/or angles relative to the person) for posture analysis. The multiple views may be processed together and combined to produce a three-dimensional posture analysis output. For example, in some embodiments, the multiple views may be synchronized and stitched together and then processed, which may include calculating the defined positions and angles between various data points and/or lines extending between the data points for each of the images. A three-dimensional image and/or video may then be output with a three-dimensional posture skeleton superimposed over the image and/or video. In other embodiments, each of the multiple views may be processed individually and later synchronized and stitched together to form a three-dimensional image and/or video and posture skeleton.

Once the three-dimensional image and/or video has been generated, the image and/or video may be output to the user, possibly along with positional data, such as angular data and/or absolute positions of one or more of the body parts for each analyzed image and/or frame. The user may then rotate the image to view of the analyzed person from different angles. As the image is rotated, the posture skeleton is rotated in synch with the image, allowing the user to view the positioning of the analyzed person from various angles. This may be particularly useful, as it allows for quick and easy visualization of the user from multiple angles to view, analyze, and correct the movement of the person along multiple axes and/or multiple angles.

Figure 3:
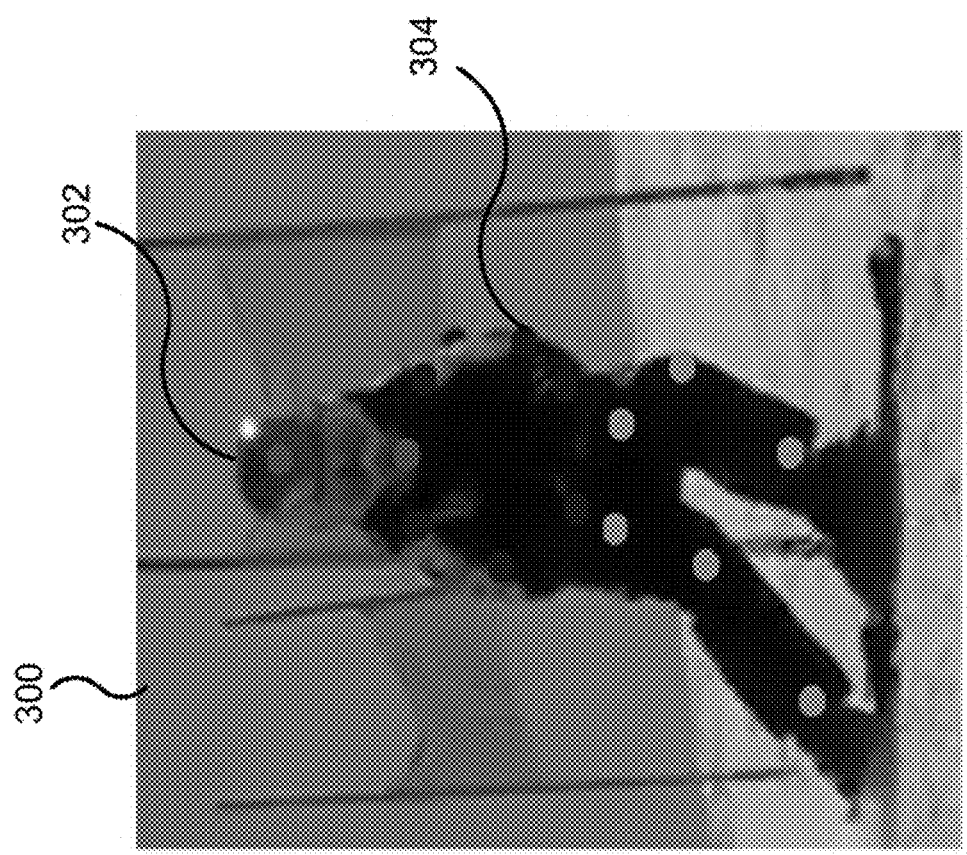
FIG. 3 illustrates an image with a number of data points representing body parts according to embodiments.

FIG. 3 illustrates an image 300 in which a skier 302 is identified. Pose detection has been performed and a number of body parts have been identified. Data points 304 have been assigned to the locations of the various body parts. As illustrated, data points 304 have been assigned to the skier's ankles, knees, hips, wrists, elbows, shoulders, and chin, although other body parts may be identified in some embodiments.

Figure 4A:
FIG. 4A illustrates a screen of a webpage for submitting an image for posture analysis according to embodiments.
Figure 4B:
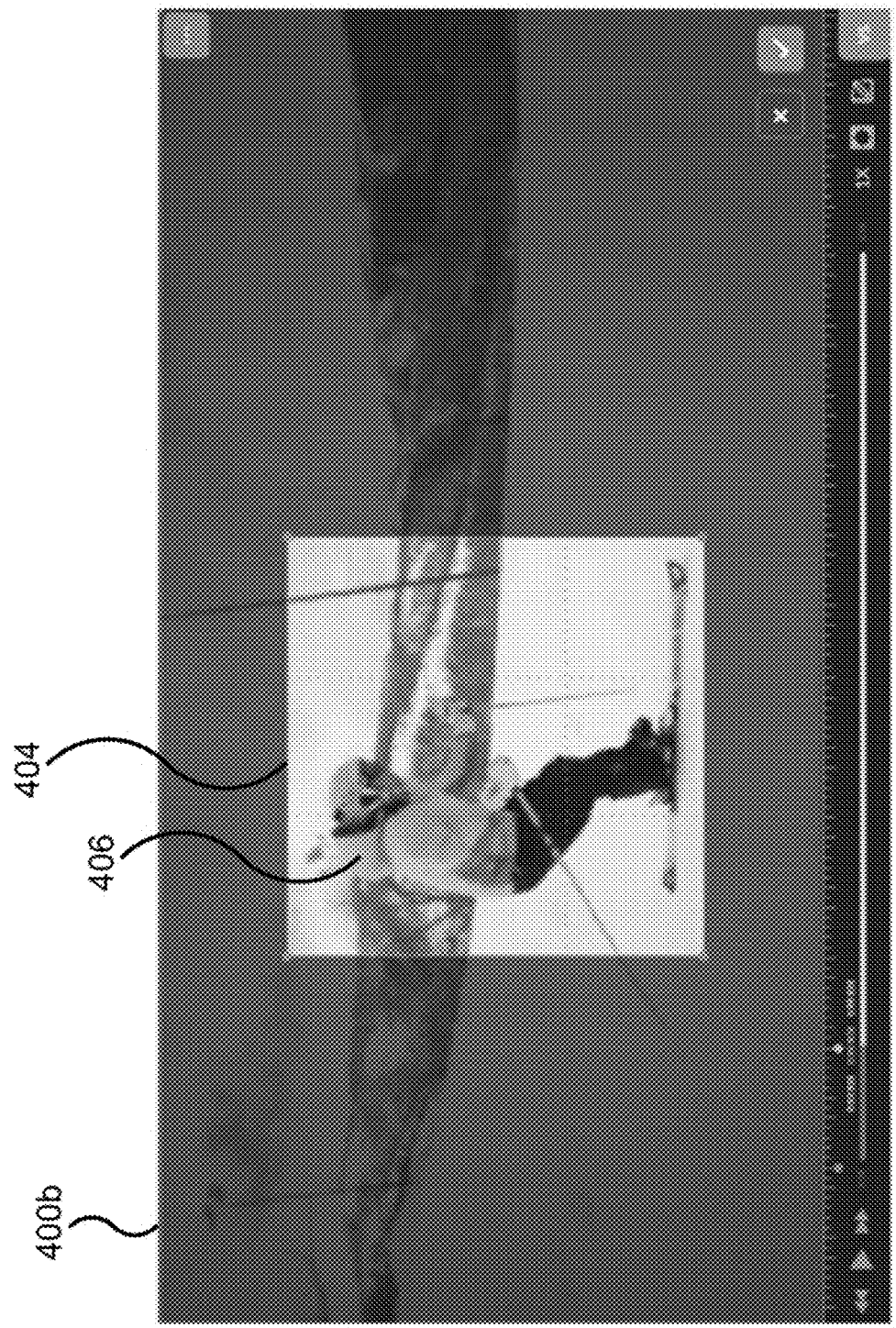
FIG. 4B illustrates a screen of a webpage for submitting an image for posture analysis according to embodiments.
Figure 4C:
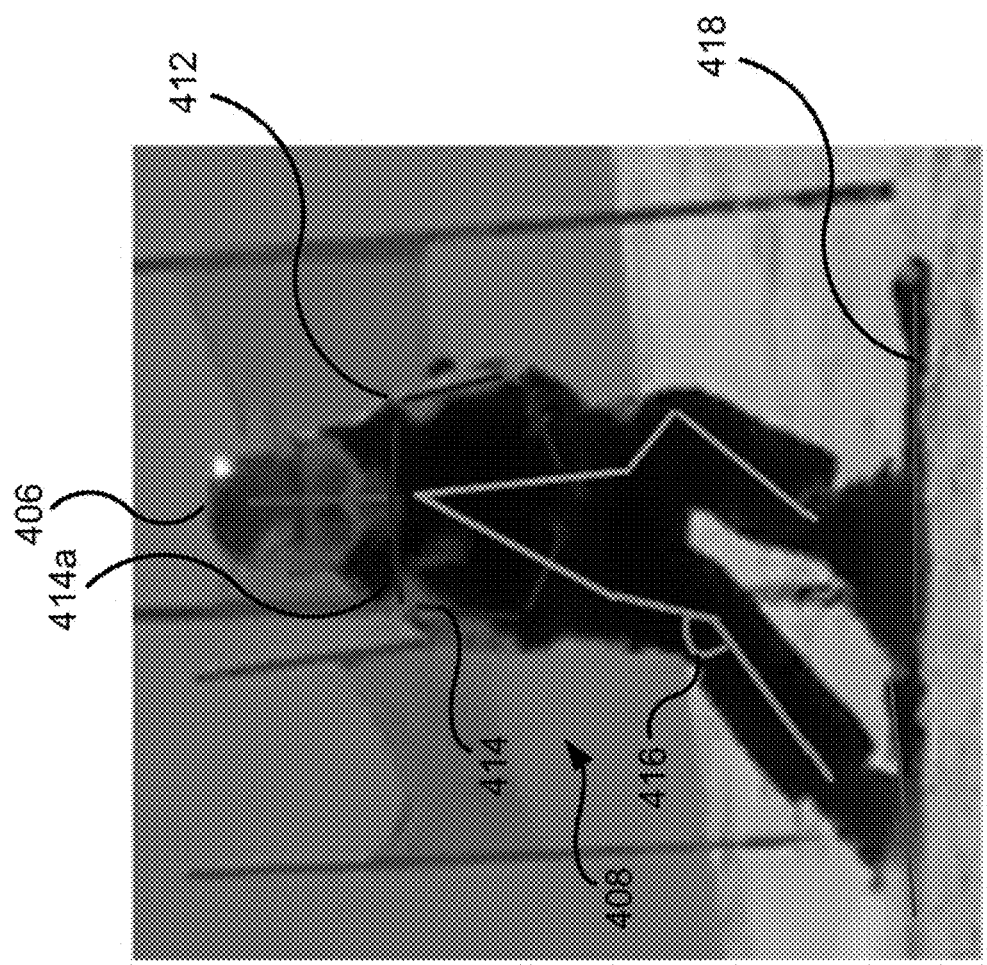
FIG. 4C illustrates a screen with an outputted image with a posture skeleton superimposed over a user according to embodiments.

In practice, the web application 100 and/or software platform 200 may present an interface that allows users to upload, import, and/or otherwise provide images for posture analysis. FIGS. 4A-4C illustrate the selection and analysis process. For example, as shown in FIG. 4A, webpage screen 400a allows the user the user to upload and/or otherwise provide an image for analysis. Once one or more images have been provided, the user may select one or more images to have analyzed. The user may then select an analysis icon to navigate to an analysis screen 400b as shown in FIG. 4B. The user may select whether only a single frame (or the only frame for still images) or an interval of frames (for a video) is to be analyzed, such as using a menu 402. In the event that an interval of frames is selected, the user may specify which interval of the video is to be analyzed. For example, in some embodiments, the interval may be selected by manipulating a slider to select timestamps and/or frame numbers for analysis. In other embodiments, the user may key in a selected interval for analysis. In some embodiments, the user may also identify a person within the image to analyze. For example, the user may draw a box 404 around the person in the image (here, a skier 406) who is to be analyzed, click on the person's body, and/or otherwise indicate a selection of the person.

In some embodiments, when the user tries to submit a request to a posture analysis system (such as posture analysis system 104), the user will be asked to select one or more parameters (such as by identifying a sports type, movement, and/or other parameter) associated with the image. In some embodiments, marking the parameter may involve selecting a predefined term from a list and/or a user keying in a value. This allows the web application 100 and/or software platform 200 to select comparison images and/or analytics (such as optimal movement metrics for a particular movement or tasks) for a given image.

Once the video is submitted, the web application 100 and/or software application may perform the posture/movement analysis. In some embodiments, the "Analysis" icon may be disabled and a loading indicator may be presented that will inform user that analysis is in progress. Once the posture analysis system completes its processing of the image, the posture analysis system may send a request to the web application, which in turn informs the user that the analysis is completed.

Once the processing is complete, the web application 100 and/or software platform 200 will create a "posture skeleton" from point data that is returned from the posture analysis system. As noted above, the posture skeleton may serve as a geometrical representation of the pose of the person and may include lines interconnecting at least some of the of data points. For example, as illustrated in FIG. 4C, a posture skeleton 408 has been superimposed over the skier 406. Posture skeleton 408 includes a number of lines 414 that connect various data points 412 of the skier 406. For example, a line 414a represents the alignment of the skier's shoulders and extends between the two data points 412 of the shoulders. Similar lines 414 are provided that indicate positioning of the skier's upper arms, lower arms, upper legs, lower legs, etc. When presented with such an image, the user is able to select two or more lines 414 from the posture skeleton 408 to automatically see angle information (which may be generated by a post-processing module of the posture analysis system). For example, as shown here, the lines 414 representing the skier's right upper leg and right lower leg have been selected to generate angle 416, which shows the degree of bend in the skier's knee. It will be appreciated that the user does not have to select adjacent lines 414. Rather, any two lines 414 may be selected and angle information may automatically be provided to the user. For example, if proper form dictates that two of the limbs should be parallel, users will be able to see if their limbs are properly oriented. In some embodiments, for predefined sport categories, the angles 416 may be preselected, however user may be able to make custom selections.

As just one example, the angle 416 between two of the lines 414 may be derived using the following formula:

$$\cos \theta = (\overrightarrow{u} \cdot \overrightarrow{v})/(\|\overrightarrow{u}\| \|\overrightarrow{v}\|)$$

A simplified formula may be used in some embodiments. For example, the simplified formula may be:

$$\cos \alpha = \frac{\overrightarrow{a} \overrightarrow{b}}{|\overrightarrow{a}| |\overrightarrow{b}|}$$

In some embodiments, the web application may perform such calculations using the following code:

```
vm.calculateBodyPartsAngleSubRoutine=function
   (firstJoint,secondJoint,currentJoint){
   var firstVector=[vm.circleList[firstJoint].left-vm.cir-
      cleList[currentJoint].left,vm.circleList[firstJoint]
      .top-vm.circleList[currentJoint].top];
   var secondVector=[vm.circleList[secondJoint].left-vm-
      .circleList[currentJoint].left,vm.circleList[second-
      Joint].top-vm.circleList[currentJoint].top];
   var value=((firstVector[0]*secondVector[0])+(firstVec-
      tor[1]*secondVector[1]))/
   (Math.sqrt((Math.pow(firstVector[0],2)+Math.pow
      (firstVector[1],2)))* Math.sqrt((Math.pow(secondVec-
      tor[0],2)+Math.pow(secondVector[1],2))));
   return (Math.a cos(value)*(180/Math.PI)).
```

However, it will be appreciated that the code above is merely one example and other variations in similar and/or different programming languages are possible in accordance with the present invention.

In some embodiments, the user will have the ability to correct the posture skeleton 408 on an image. For example, the user may move data points 412 and/or lines 414 on the outputted image in case the data points 412 and/or lines 414 been placed incorrectly by the posture analysis system. For example, in embodiments in which the image includes a video having multiple frames, the data points 412 and/or lines 414 may be offset from the correct frame by one or more frames. As just one example, the tenth frame may include a posture skeleton 408 that is in alignment with the pose on the eleventh or twelfth frame. The user may then manually drag or otherwise move the data points 412 and/or lines 414 to the correct locations on the body (here skier 406). In some embodiments, rather than manipulating the data points 412 and/or lines 414, the user may cycle through the frames while the posture skeleton 408 is stationary, allowing the user to synch up the existing posture skeleton 408 with the correct frame, without any need to modify the posture skeleton 408 itself. In instances where the frames and/or posture skeleton 408 have been altered, any modified information may be sent back to the posture analysis system, which may use this information to further improve its computation algorithms. Additionally, if a correction is made on one frame of a video, corresponding corrections may be propagated throughout each frame of the video such that the user does not need to correct each frame individually.

In some embodiments, rather than just doing posture analysis on a person, the systems and methods described herein may also capture positions of equipment 418. For example, sports equipment 418 (bats, golf clubs, skis, ski poles, etc.) that are being help or otherwise attached to a person may be detected (automatically and/or manually by a user). The positions and/or orientations of the equipment 418 throughout a movement may be analyzed with the results outputted (graphically, numerically, on video, etc.). This may allow for additional review and correction of proper form for a movement involving equipment that may not be identified solely from tracking the person's movements.

In some embodiments, additional data points and/or lines may be added by a user manually. For example, if a user wants to get positional analysis (such as angular information) of a body part that is not analyzed automatically by the web application 100 and/or software platform 200, the user may select the location for new data points 412 and/or lines 414 to be positioned and may have the web application 100 and/or software platform 200 analyze and return angular information for the relevant body parts. In some embodiments, the user may use such tools to select equipment for positional analysis.

Figure 5:
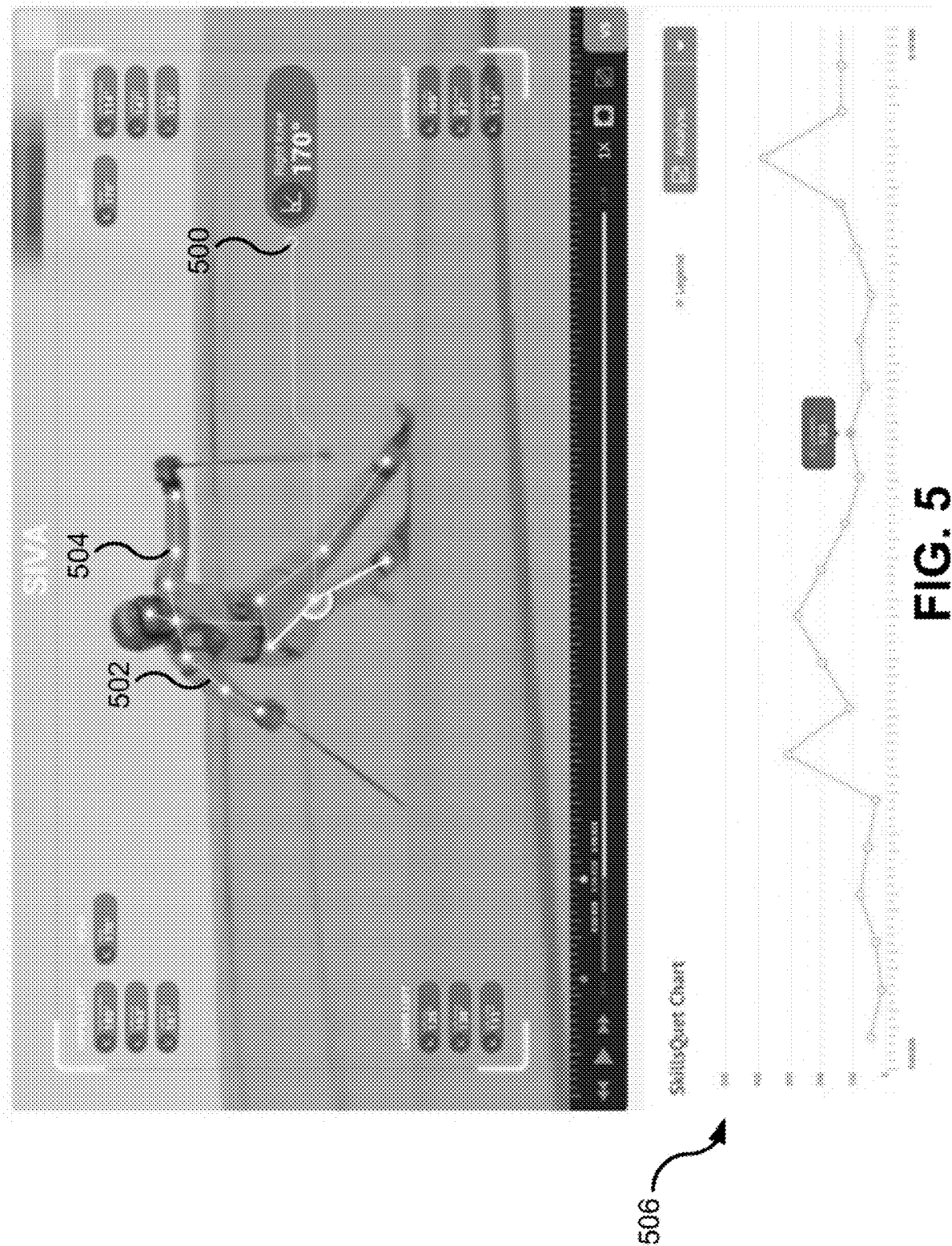
FIG. 5 illustrates a screen and graph with posture analytics information according to embodiments.

In embodiments in which an interval analysis of a video (i.e. multiple video frames) is completed, the posture analysis system will return a list of points, one for each frame. The web application 100 and/or software platform 200 may create the skeleton information, and angle information for selected lines will be displayed as a graph 506 on the screen as illustrated in FIG. 5. When the user plays the video, with annotation 500 selected, only the annotated part will play, with the posture skeleton 502 moving on top of the video frame to show the changes. Here, users will be able to select an individual data point 504 and a reference type for that point, with the reference type being a stationary point for that calculation. This result may be graphed as well.

In video embodiments, the graph 506 may illustrate the change in body position of one or more body parts (and/or equipment) over time throughout the analyzed movement. For example, as shown in FIG. 5, the angle of the skier's right knee is illustrated over time as the skier advances down the ski slope. In some embodiments, the user may select a particular angle on the image to have graph 506 populated with the relevant angular data. While illustrated with a single angle being tracked, it will be appreciated that in some embodiments the angles for multiple body parts may be displayed at the same time on graph 506. In some embodiments, along with (or instead of) graph 506, a table (not shown) may be displayed that indicates the numerical value of the position/angle of one or more body parts throughout execution of the movement.

In some embodiments, the web application 100 and/or software platform 200 may also output a numerical output of one or more angles that may be particularly useful to the movement being analyzed (which may be determined based on the detected movement and/or any parameters input by the user prior to analysis). For example, for a skier, the knees, hips, shoulders, and/or elbows may be particularly useful to analyzing the skier's form. These body parts may be pre-defined based on the movement detected/selected and/or may be selected post-processing by the user. In some embodiments, these angles may be superimposed over the image and may change as new frames of the image are displayed to reflect the positioning of the person in the image at each particular frame.

In some embodiments, a user may tag and/or otherwise facilitate sharing of an analyzed (or raw/unprocessed) image. For example, the user may identify one or more other people who can access a particular image that has been uploaded or otherwise provided to the web application 100 and/or software platform 200. In some embodiments, this may be done by providing one or more phone numbers, email addresses, and/or other handles that allow the web application 100 and/or software platform 200 to identify and/or communicate with other people. In such a manner, a user may share an image with a team of individuals, such as coaches, trainers, athletes, etc.

In some embodiments, the user may create posture analysis with multiple images. In such instances, both images will be analyzed simultaneously using a single set of parameters and/or other constraints that will be applied to each of the images. This allows the user to compare the person in the image with other instances of the person performing the movement and/or with others performing the movement. For example, the user may compare the person's movement with a peer and/or a professional in the discipline shown in the image.

Figure 6:
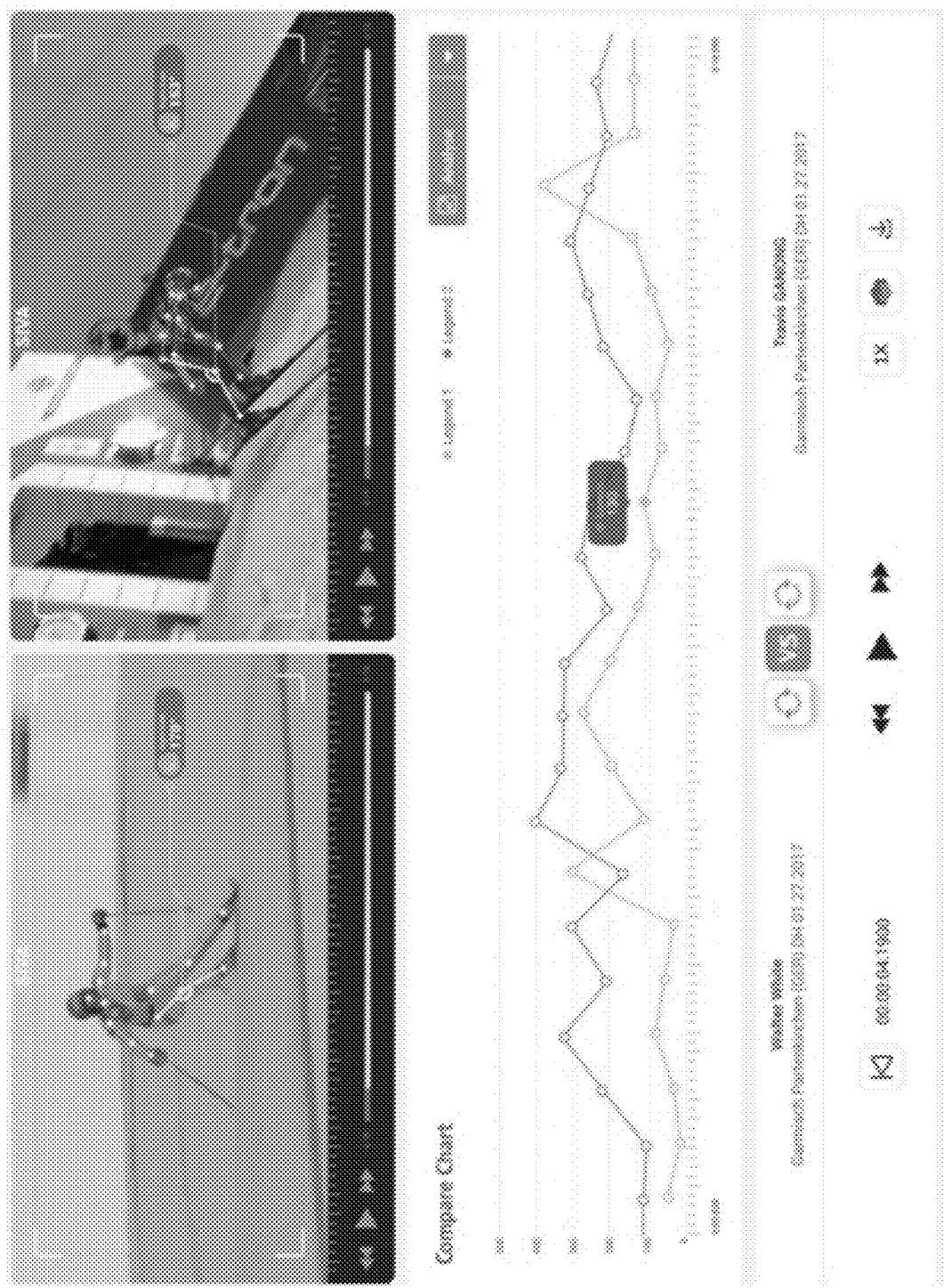
FIG. 6 illustrates multiple images in a comparison mode according to embodiments.

In some embodiments, a user may be able to view multiple images side by side (vertically and/or horizontally) as shown in FIG. 6. In such embodiments, a list may be provided that identifies analysis that is triggered for a particular comparison. In some embodiments, any results of posture analysis for comparison images may also be available for a single one of the images as well. In comparison images, tables and graphs showing comparisons of angles from the various videos may be generated, allowing users to compare different athletic attempts and/or different points of an attempt of angles and combined graphs.

It has been observed that a recurring pattern exists between top performers of particular movements in different fields, from top athletes to models that are cat-walking. These top performers tend to move with a high degree of symmetry between the body angles and timing as an image is analyzed from frame to frame, while amateurs and others at lower skill levels often exhibit more unevenness and spread of angles when performing the same movements. In some embodiments, the web application 100 and/or software platform 200 may analyze the degree of symmetry between body angles and timing for a person within an image and may provide suggestions on how to improve the person's movement and/or providing a relative skill level assessment based on the symmetry and/or consistency of the movement. For example, the web application 100 and/or software platform 200 may detect that a person's symmetry and/or consistency of movement for one or more body parts is less consistent and/or less symmetrical than those of a top performer and may indicate that an adjustment in the movement of one or more of these body parts would help optimize the person's movement.

Figure 7:
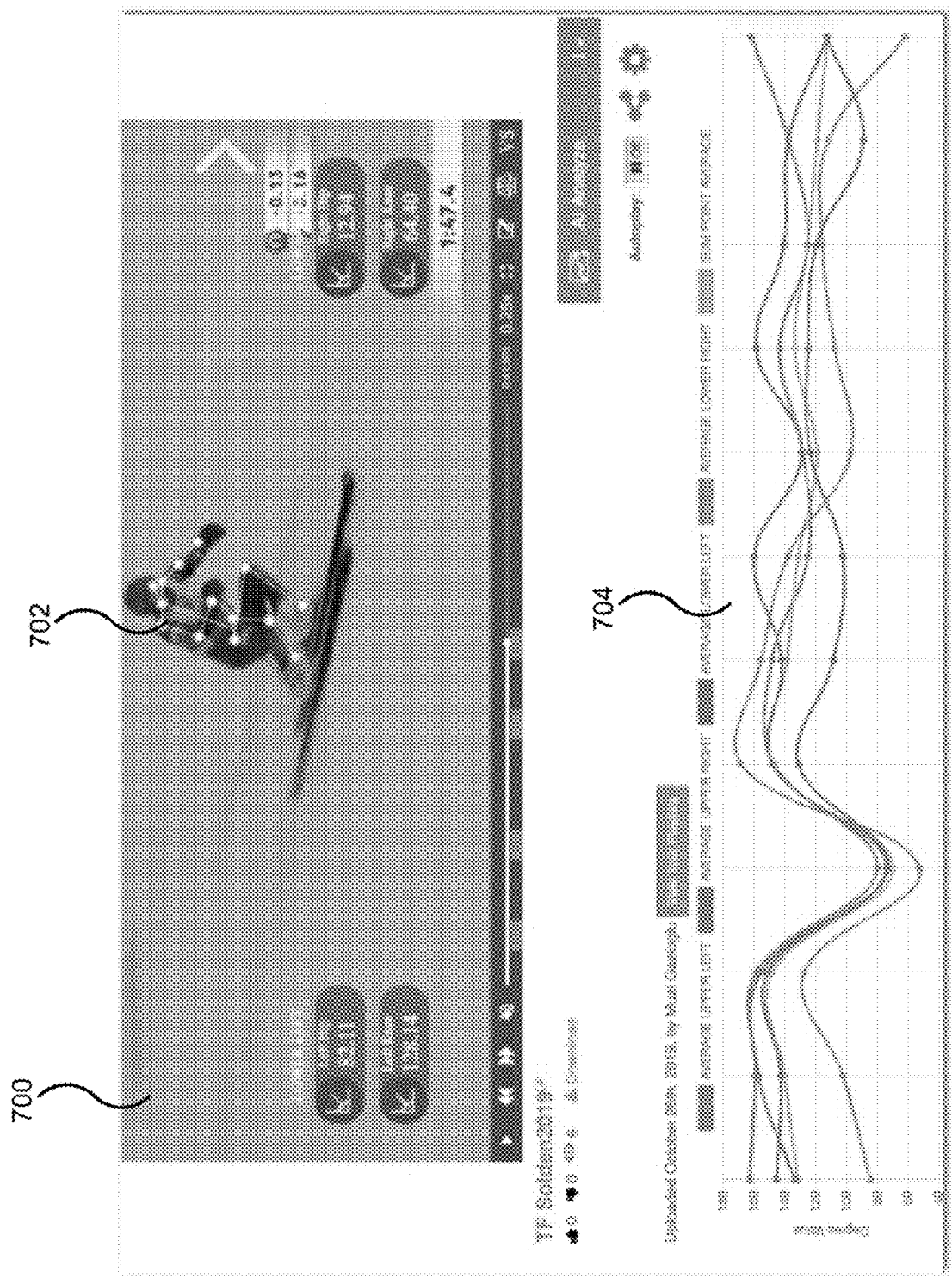
FIG. 7 illustrates an output of posture analytics information for a top performing skier according to embodiments.
Figure 8:
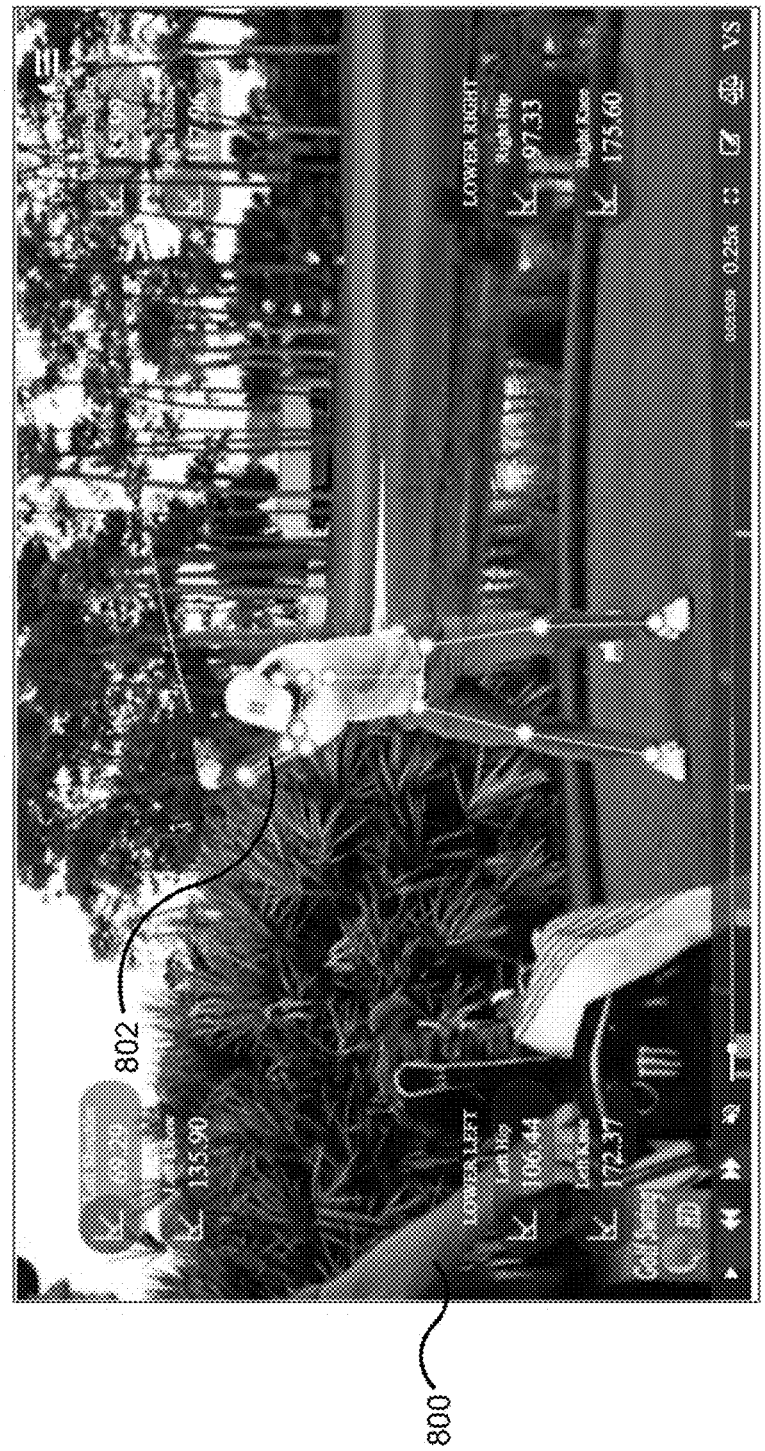
FIG. 8 illustrates an output of posture analytics information for a top performing golfer according to embodiments.
Figure 8:
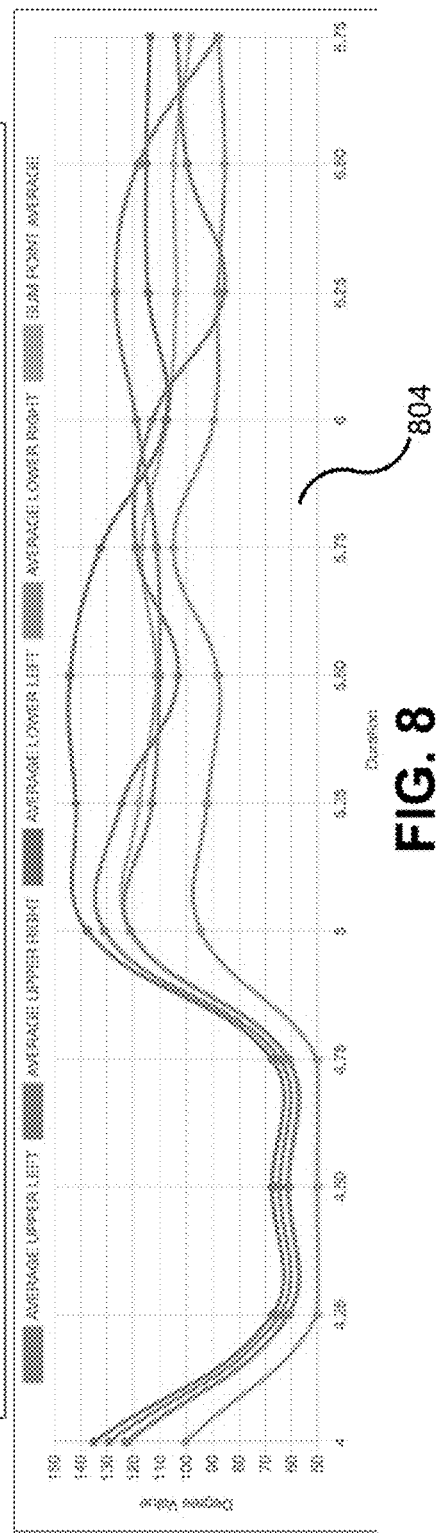
Figure 9:
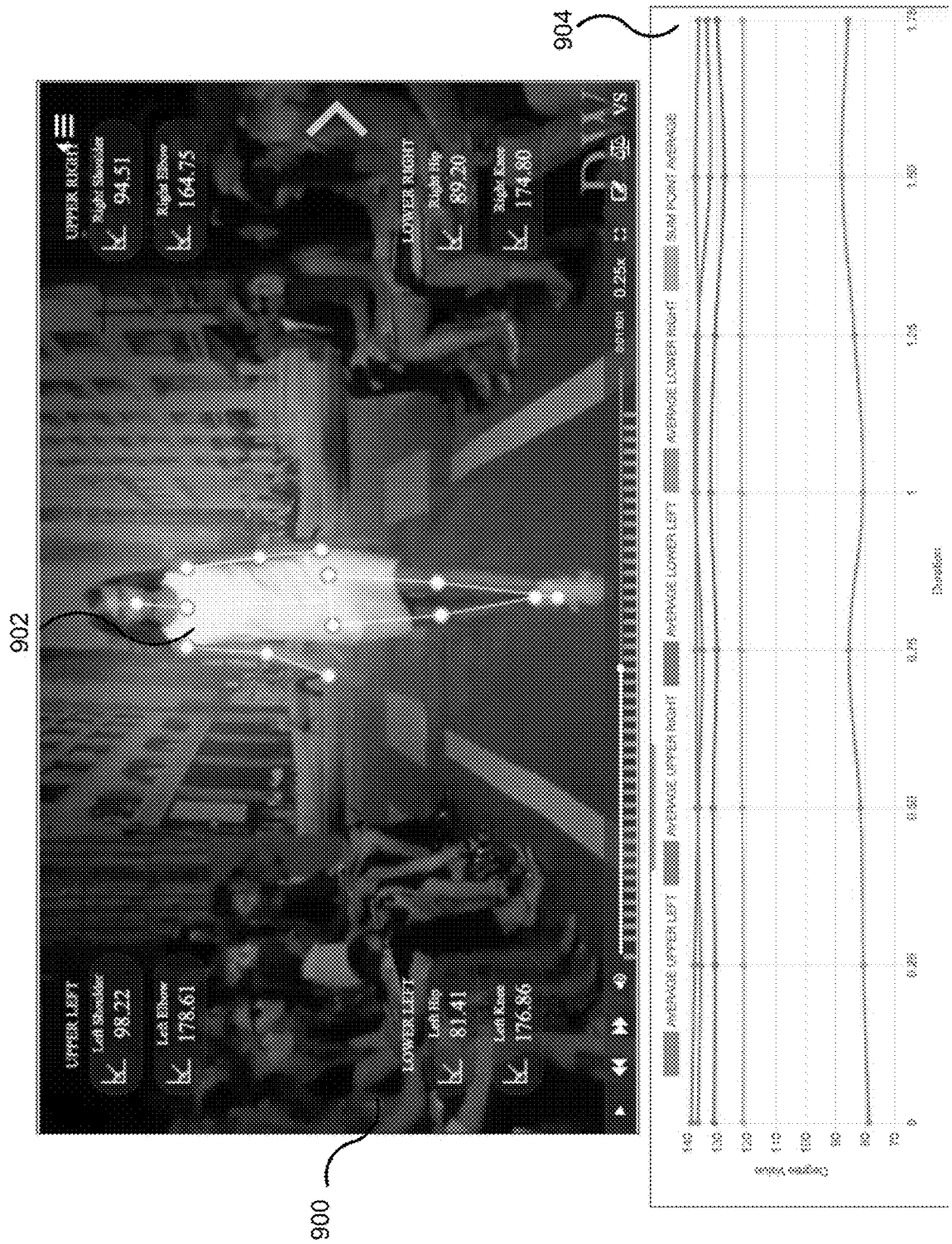
FIG. 9 illustrates an output of posture analytics information for a top performing runway model according to embodiments.

FIGS. 7-9, illustrate outputs of movement analysis of top performers of various movements. As shown in FIG. 7 an image 700 of a top performing skier is displayed, with a posture skeleton 702 superimposed over the skier. A graph 704 illustrates average angles of quadrants of the skier's body (upper left, upper right, lower left, lower right, etc.), as well as a sum point average of the angles. As shown in graph 704, these average angles are maintained quite close to one another, with a high degree of symmetry and consistency along the skier's movement. FIG. 8 illustrates an image 800 of a top performing golfer. A posture skeleton 802 is superimposed over the golfer and a graph 804 is shown that illustrates average angles of quadrants of the golfer's body, as well as a sum point average of the angles. Similar to the angles exhibited by the skier in FIG. 7, the golfer's average angles are maintained quite close to one another, with a high degree of symmetry and consistency along the golfer's movement. FIG. 9 illustrates an image 900 of a top performing runway model. A posture skeleton 902 is superimposed over the runway model and a graph 904 is shown that illustrates average angles of quadrants of the model's body, as well as a sum point average of the angles. The model's average angles are maintained quite close to one another, with an exceptionally high degree of symmetry and consistency along the model's movement.

Figure 10:
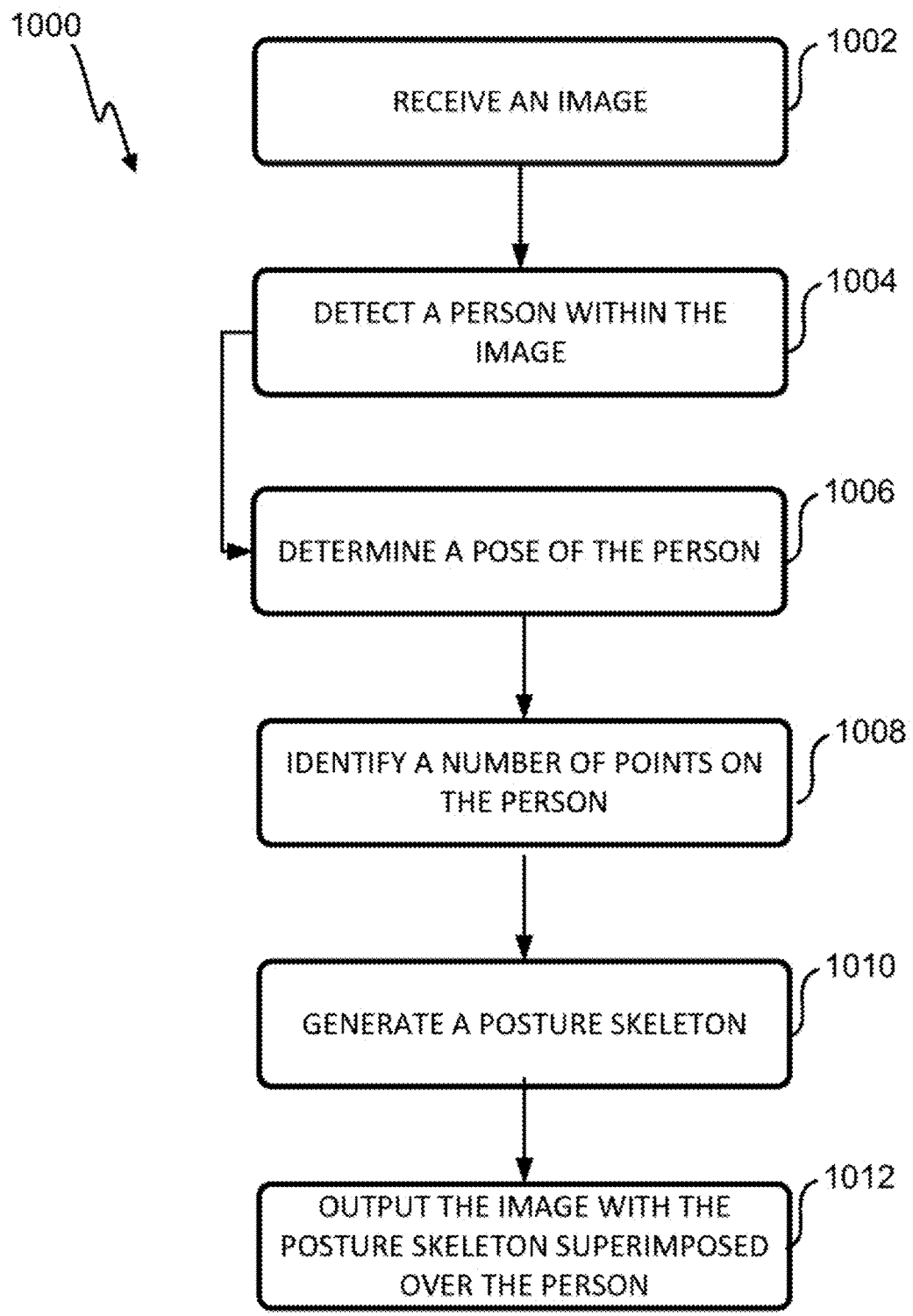
FIG. 10 is a flowchart illustrating a process for providing automated video analytics according to embodiments.

FIG. 10 illustrates a flow chart of a process 1000 for providing automated video analytics. The process 1000 may be performed locally using a user's computing device using software platform 200 and/or remotely using a cloud-based system, such as using web application 100. Process 1000 may begin at block 1002 by receiving, at a computing device, an image. The image may be a still image and/or a video, which may be provided to the computing device by uploading and/or otherwise providing the image to the web application 100 and/or software platform 200. The computing device may be the user's device in a local processing system or the server that executes the cloud-based processing system. The image may be provided to the cloud-based service and/or via a mobile application for processing. Once received at the computing device, a person is detected within the image at block 1004. This may be done, for example, by using an object detection network to look at the entire image to make predictions as to what objects within the image are people. In some embodiments, detecting the person may also include receiving a selection from a user that identifies the person within the image. For example, the user may click on, highlight, select, draw a box around, and/or otherwise designate a the person in the image to be analyzed.

A pose of the person within the image may be determined at block 1006, which may involve determining the location of certain body parts in the image. A number of points (such as body parts) may be identified based on the pose at block 1008. A posture skeleton may be generated based on the plurality of points at block 1010. The posture skeleton may include lines interconnecting at least some of the of points and may be a geometrical representation of the pose of the person. Once the posture skeleton has been generated, an image with the posture skeleton superimposed over the person may be outputted at block 1012. In some embodiments, the output may also include an angle of at least one body part. In local processing embodiments, the output(s) may be displayed on a screen of the user device that is performing the processing. In cloud-based embodiments, the output(s) may be sent to a remote computing device (such as a user device) for subsequent display thereon.

In embodiments in which the image is a video, a posture skeleton may be generated for some or all frames of the video. In such embodiments, outputting the image may include outputting a video file in which the person moves and each posture skeleton moves in synch with the person on a frame by frame basis. In some embodiments, the user may determine that the posture skeleton(s) and the image(s) do not properly line up and may provide an input that causes an adjustment of at least a portion of the posture skeleton for at least one of the frames. In such embodiments, any adjustment may cause a corresponding adjustment to be made on the other frames of the image.

In some embodiments, multiple images may be analyzed together and/or compared to one another. In such embodiments, the computing device may output a second image (or multiple images) in a side by side (vertical and/or horizontal) arrangement with the first image.

In some embodiments, three-dimensional position analysis may be performed on a set of images. For example, one or more images may include multiple views of the person, with each of the multiple views being taken from a different angle. The web application 100 and/or software platform 200 may stitch the multiple views together to form a three-dimensional view of the person. In some embodiments, the three-dimensional view of the person may be outputted, along with annotations such as a posture skeleton. In some embodiments, the annotated three-dimensional video is rotatable to change a viewing angle of the annotated video. This may cause a corresponding rotation of the posture skeleton, allowing a user to view the positions and/or angles of various body parts from different angles for a given frame of the video.

Figure 11:
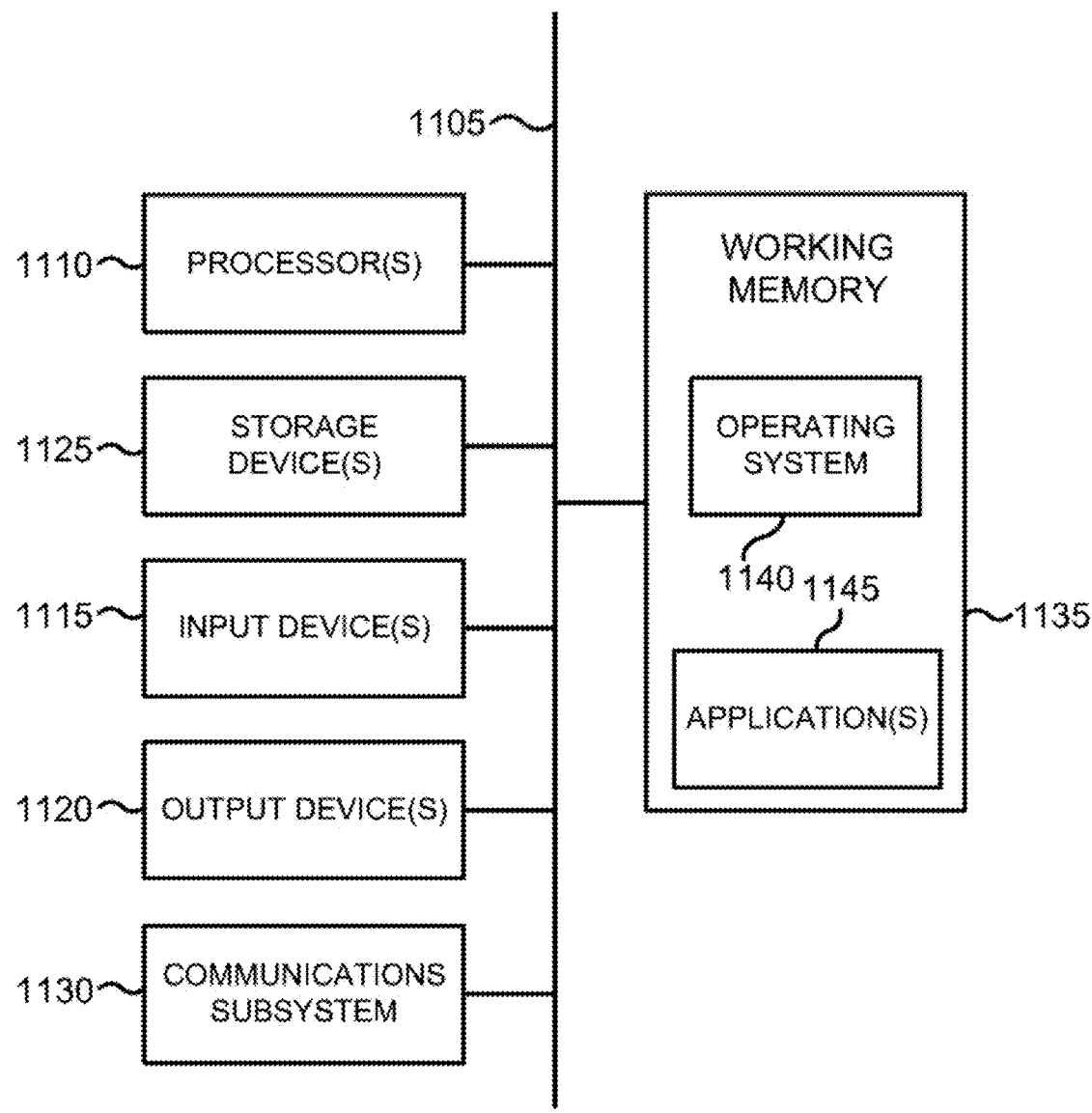
FIG. 11 illustrates a block diagram of a computing system according to embodiments.

A computer system as illustrated in FIG. 11 may be incorporated as part of the previously described computerized devices. For example, computer system 1100 can represent some of the components of computing devices, such as web application 100, posture analysis system 104, user device 202 executing software platform 200, and/or other computing devices described herein. FIG. 11 provides a schematic illustration of one embodiment of a computer system 1100 that can perform the methods provided by various other embodiments, as described herein. FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105 (or may otherwise be in communication, as appropriate). The hardware elements may include a processing unit 1110, including without limitation one or more processors, such as one or more central processing units (CPUs), graphical processing units (GPUs), special-purpose processors (such as digital signal processing chips, graphics acceleration processors, and/or the like); one or more input devices 1115, which can include without limitation a keyboard, a touchscreen, receiver, a motion sensor, a camera, a smartcard reader, a contactless media reader, and/or the like; and one or more output devices 1120, which can include without limitation a display device, a speaker, a printer, a writing module, and/or the like.

The computer system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1100 might also include a communication interface 1130, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 1130 may permit data to be exchanged with a network (such as the network described below, to name one example), other computer systems, and/or any other devices described herein. In many embodiments, the computer system 1100 will further comprise a non-transitory working memory 1135, which can include a RAM or ROM device, as described above.

The computer system 1100 also can comprise software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 1110, applications 1145, etc.) Further, connection to other computing devices such as network input/output devices may be employed.

Some embodiments may employ a computer system (such as the computer system 1100) to perform methods in accordance with the disclosure. For example, some or all of the procedures of the described methods may be performed by the computer system 1100 in response to processing unit 1110 executing one or more sequences of one or more instructions (which might be incorporated into the operating system 1140 and/or other code, such as an application program 1145) contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processing unit 1110 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1100, various computer-readable media might be involved in providing instructions/code to processing unit 1110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1125. Volatile media include, without limitation, dynamic memory, such as the working memory 1135. Transmission media include, without limitation, coaxial cables, copper wire, and fiber optics, including the wires that comprise the bus 1105, as well as the various components of the communication interface 1130 (and/or the media by which the communication interface 1130 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 1130 (and/or components thereof) generally will receive the signals, and the bus 1105 then might carry the signals (and/or the data, instructions, etc. carried by the signals) to the working memory 1135, from which the processor(s) 1105 retrieves and executes the instructions. The instructions received by the working memory 1135 may optionally be stored on a non-transitory storage device 1125 either before or after execution by the processing unit 1110.

In the embodiments described above, and in the attached Appendix, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method for providing automated video analytics, comprising:

receiving, at a computing device, a first image and a second image;

detecting a person within each of the first image and the second image;

determining a pose of the person within each of the first image and the second image;

identifying a plurality of points based on the pose, each point being indicative of a location of a body part of the person;

generating a posture skeleton based on the plurality of points, the posture skeleton comprising lines interconnecting at least some of the plurality of points;

outputting the first image with the posture skeleton superimposed over the person;

analyzing a degree of symmetry between body angles of the person in each of the first image and the second image;

analyzing a consistency of a movement being performed by the person in the first image and the second image; and automatically providing a suggestion on how to improve the movement based on the degree of symmetry and the consistency of the movement.

2. The method for providing automated video analytics of claim 1, wherein:

each of the first image and the second image is received over a network from a remote computing device.

3. The method for providing automated video analytics of claim 1, further comprising:

determining an angle of at least one of the body parts; and outputting the angle of the at least one of the body parts.

4. The method for providing automated video analytics of claim 1, wherein:

each of the first image and the second image comprise individual frames of a video.

5. The method for providing automated video analytics of claim 4, wherein:

an additional posture skeleton is generated for at least one additional frame of the video.

6. The method for providing automated video analytics of claim 5, wherein:

outputting the image comprises outputting a video file in which the person moves and the posture skeleton and the additional posture skeleton move in synch with the person.

7. The method for providing automated video analytics of claim 1, wherein:

the outputted image comprises a three-dimensional image.

8. The method for providing automated video analytics of claim 1, wherein:

the consistency of the movement is based on a single instance of the movement.

9. A computing device for providing automated video analytics, comprising:
a communications interface;
a processor; and
a memory having instructions stored thereon that, when executed by the processor, cause the computing device to:
receive a series of images associated with a movement of a person;
detect the person within the series of images;
determine a pose of the person within the series of images;
identify a plurality of points based on the pose, each point being indicative of a location of a body part of the person;
generate a posture skeleton based on the plurality of points, the posture skeleton comprising lines interconnecting at least some of the plurality of points; and
output a first image of the series of images with the posture skeleton superimposed over the person;
receive an input from a user that comprises an adjustment to correct a position of at least one data point of the posture skeleton of the first image to correspond with a proper location of a body part of the person; and
cause a corresponding adjustment to be made on at least one subsequent image frame of the series of images.

10. The computing device for providing automated video analytics of claim 9, wherein:
the processor is further configured to output an additional image in a side by side arrangement with the image.

11. The computing device for providing automated video analytics of claim 9, wherein:
detecting a person within the image comprises receiving a selection that identifies the person within the image.

12. The computing device for providing automated video analytics of claim 9, wherein:
outputting the image comprises communicating the image to a remote computing device.

13. The computing device for providing automated video analytics of claim 9, wherein:
the posture skeleton comprises a geometrical representation of the pose of the person.

14. The computing device for providing automated video analytics of claim 9, wherein the processor is further configured to:
receive one or more parameters associated with image; and
provide analysis of the image based on the one or more parameters.

15. A method for providing automated video analytics, comprising:
receiving, at a computing device, an image;
detecting a person within the image;
receiving, at the computing device, a selection from a user that indicates a sport and a specific sport movement being performed by the person within the image, wherein the specific sport movement is selected from a plurality of sport movements associated with the sport;
determining a pose of the person;
identifying a plurality of points based on each pose, each point being indicative of a location of a body part of the person;
generating a posture skeleton for the image based on the plurality of points, each posture skeleton comprising lines interconnecting at least some of the plurality of points; and
analyzing the pose of the person based on the selected sport and the selected sport movement;
generating and outputting at least one movement metric associated with the person based at least in part on the selection and the analysis of the pose of the person;
outputting an annotated image with the posture skeleton superimposed over the person; and
outputting an additional image in a side by side arrangement with the annotated image, wherein the additional image is chosen based at least in part on the selection and depicts a previously analyzed similar movement of the person or another person.

16. The method for providing automated video analytics of claim 15, further comprising:
receiving an input comprising an adjustment of at least a portion of the posture skeleton for the image.

17. The method for providing automated video analytics of claim 15, wherein:
the image comprises multiple views of the person, each of the multiple views being taken from a different angle; and
the method further comprises stitching the multiple views together to form a three-dimensional view of the person.

18. The method for providing automated video analytics of claim 17, wherein:
the annotated image comprises the three-dimensional view of the person.

19. The method for providing automated video analytics of claim 18, wherein:
the annotated image is rotatable to change a viewing angle of the annotated image; and
rotation of the annotated image causes a corresponding rotation of the posture skeleton.

20. The method for providing automated video analytics of claim 15, further comprising:
comparing the image to a previously stored image; and
providing a suggested movement correction based on the comparison.

* * * * *